United States Patent
Carbon et al.

(10) Patent No.: US 9,600,252 B2
(45) Date of Patent: Mar. 21, 2017

(54) SYSTEM FOR DYNAMIC COMPILATION OF AT LEAST ONE INSTRUCTION FLOW

(71) Applicant: COMMISSARIAT A L'ENERGIE ATOMIQUE ET AUX ENERGIES ALTERNATIVES, Paris (FR)

(72) Inventors: Alexandre Carbon, Bures-sur-Yvettes (FR); Yves Lhuiller, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 100 days.

(21) Appl. No.: 14/767,276

(22) PCT Filed: Feb. 19, 2014

(86) PCT No.: PCT/EP2014/053212
§ 371 (c)(1),
(2) Date: Aug. 11, 2015

(87) PCT Pub. No.: WO2014/128153
PCT Pub. Date: Aug. 28, 2014

(65) Prior Publication Data
US 2016/0004519 A1 Jan. 7, 2016

(30) Foreign Application Priority Data
Feb. 19, 2013 (FR) ...................... 13 51409

(51) Int. Cl.
*G06F 9/45* (2006.01)
*G06F 9/455* (2006.01)
*G06F 9/44* (2006.01)

(52) U.S. Cl.
CPC ................ *G06F 8/443* (2013.01); *G06F 8/70* (2013.01); *G06F 9/4552* (2013.01); *G06F 9/45504* (2013.01)

(58) Field of Classification Search
CPC ............... G06F 9/45504; G06F 9/4552; G06F 9/54416; G06F 8/70; G06F 8/443; G06F 8/4434
(Continued)

(56) References Cited

U.S. PATENT DOCUMENTS 7,480,619 B1 * 1/2009 Scott ............................ 704/275
7,924,590 B1 * 4/2011 Starovoitov ............ G06F 8/427
365/49.16
(Continued)

FOREIGN PATENT DOCUMENTS

EP 1 197 847 A2 4/2002

OTHER PUBLICATIONS

Ramesh Radhakrishnan et al., "Improving Java Performance Using Hardware Translation," Proceedings of the International Conference on Custom Andsemicustom ICS, Jan. 1, 2001, pp. 427-439, XP002961169.
(Continued)

*Primary Examiner* — Anna Deng
(74) *Attorney, Agent, or Firm* — Baker & Hostetler LLP

(57) ABSTRACT

A compilation system for at least one instruction flow to be executed on a target circuit comprises a hardware acceleration circuit performing the functions of loading a set of at least one portion of said flow to a memory internal to the circuit and of decoding the set; the instructions resulting from the loading and from the decoding being transmitted to a programmable core operating in parallel to the hardware acceleration circuit, the programmable core producing the transcription of the decoded instructions into a machine code suitable for execution on the target circuit.

9 Claims, 5 Drawing Sheets

(58) Field of Classification Search
USPC .................................................. 717/153, 158
See application file for complete search history.

(56) References Cited

U.S. PATENT DOCUMENTS

| | | | | |
|---|---|---|---|---|
| 9,092,595 | B2* | 7/2015 | Vorbach | .................... G11C 5/02 |
| 2003/0105617 | A1* | 6/2003 | Cadambi | ............. G06F 17/5022 |
| | | | | 703/14 |
| 2007/0055462 | A1* | 3/2007 | Mulligan | ............... H04N 7/148 |
| | | | | 702/36 |
| 2013/0246773 | A1* | 9/2013 | Mitran | ................ G06F 9/30058 |
| | | | | 712/227 |

OTHER PUBLICATIONS

G. Hariprakash et al., "Hardware compilation for high performance Java processors," Proceedings of the International Conference on Architecture of Computing Systems—ARCS 2002, pp. 125-133, XP009175028.

Jan Hoogerbrugge et al., "Pipelined Java Virtual Machine Interpreters," 9th International Conference on Compiler Construction, Mar. 25-Apr. 2, 2000, vol. 1781, pp. 35-49, XP008060384.

K. Scott et al., "Retargetable and Reconfigurable Software Dynamic Translation," First International Symposium on Code Generation and Optimization, Mar. 23-26, 2003, pp. 36-47, XP010638067.

* cited by examiner

SYSTEM FOR DYNAMIC COMPILATION OF AT LEAST ONE INSTRUCTION FLOW

CROSS-REFERENCE TO RELATED APPLICATIONS

This application is a National Stage of International patent application PCT/EP2014/053212, filed on Feb. 19, 2014, which claims priority to foreign French patent application No. FR 1351409, filed on Feb. 19, 2013, the disclosures of which are incorporated by reference in their entirety.

FIELD OF THE INVENTION

The invention relates to a dynamic compilation system for at least one instruction flow and applies to the field of embedded information technology.

BACKGROUND

Compilation combines a set of operations with the objective of converting a set of instructions that can be read by a human being forming a computer program into a machine code, that is to say a set of instructions that can be read by a target device. Hereinafter in the description, the target device is simply called target and corresponds, for example, to a processor.

Compilation can be described in a simplified way as a succession of three steps. A first step checks the syntax of the source code and translates it into a non-optimized intermediate representation.

A second compilation step combines a set of optimization operations that are independent of the target. An example of optimization consists in unfolding the instruction loops in such a way as to allow them to be executed sequentially. The code that is thus obtained then corresponds to an optimized intermediate representation (OIR).

A third step transforms the optimized intermediate representation into machine code, for example into assembly language. Optimizations can also be performed at this stage.

Dynamic compilation techniques are now used. This means that one or more compilation steps are applied at the time of the execution of the computer program by the target. These techniques make it possible to adapt a computer program with which a source code is associated in such a way that the latter can be executed on different targets requiring different machine codes. These techniques also make it possible to adapt a computer program in order to optimize it according to the conditions of use. The compilation step or steps implemented at the time of the execution of the program can use as input the source code, an optimized or non-optimized intermediate representation, or else a machine code to be translated for a new target requiring a different machine code or to be optimized for the current target.

In the field of embedded information technology, certain constraints have to be taken into account for the use of applications. In practice, a handheld device such as a smartphone usually has specialized computation resources, resulting from a design matched to a specific use. Furthermore, its energy consumption has to be optimized in order to guarantee a sufficient power reserve.

The dynamic compilation algorithms exhibit great irregularity. In practice, the representation in memory of the instruction flow to be processed is complex by virtue of the successive optimizations which fragment the representation of the instruction flow. It is then often difficult to predict in advance the location and the nature of the different instructions that make up the instruction flow as input. The embedded processors do not have mechanisms making it possible to manage this irregularity. The loading and decoding steps performed on the input instruction flow are particularly costly in terms of execution times on these processors because they are numerous and irregular.

By way of example, for some applications in the embedded technology field, an intermediate code is downloaded by a mobile terminal. Examples of intermediate codes are the Java byte code, the CIL (Common Infrastructure Language) byte code and the LLVM (LowLevel Virtual Machine) byte code. After having been optimized and transformed into machine code, the application can be directly executed on the target. This solution has the advantage of minimizing the quantity of memory needed to store the application on the mobile terminal. In effect, the intermediate code can be adapted so that it takes less space than the machine code of the application. Furthermore, that also avoids storing in memory different machine codes for the application in memory where a heterogeneous architecture is concerned, that is to say an architecture comprising a plurality of computation units with different instruction sets.

However, the implementation of the dynamic compilation techniques in the embedded technology field often involves a degradation of performance levels. In particular, the total execution time including phases of compilation and of execution of the applications is lengthened because of the great complexity of the algorithms and the memory occupancy is not optimized.

SUMMARY OF THE INVENTION

One aim of the invention is notably to mitigate the drawbacks of the prior art and/or to provide improvements thereto.

To this end, the subject of the invention is a compilation system for at least one instruction flow to be executed on a target circuit, said system comprising a hardware acceleration circuit performing the functions of loading a set of at least one portion of said flow to a memory internal to said circuit and of decoding said set, the instructions resulting from the loading and from the decoding being transmitted to a programmable core operating in parallel to the hardware acceleration circuit, said programmable core producing the transcription of the decoded instructions into a machine code suitable for execution on the target circuit.

In one embodiment, the instruction flow is an intermediate representation previously obtained from source code of an application to be executed.

In one embodiment, the instruction flow is the source code of an application to be executed.

In one embodiment, the instruction flow is the machine code of an application to be adapted or optimized for a given target circuit.

According to one aspect of the invention, the hardware acceleration circuit selects a portion of the instruction flow, and checks if this portion has already been translated into machine code, if so said portion is not loaded by the hardware acceleration circuit, and another portion is selected. The checking of the existence of an earlier translation of a portion of machine code is performed, for example, by comparison of the address of the portion to be loaded against the addresses of the translated portions contained in the result memory.

According to one aspect of the invention, the checking for the existence of a prior translation is implemented by browsing the result memory searching for a portion that is already translated.

The decoding of a code portion corresponds, for example, to a decomposition into a set of simple operations.

The machine code generated is, for example, transmitted to a memory to be stored.

The result memory of the loaded and decoded code is, for example, internal to the system.

In one embodiment, a mechanism determines the time during which a machine code corresponding to a code portion compiled previously by the dynamic compilation system has not been executed, the memory used to store this machine code being freed up if the latter has not been executed during a predefined time Te.

The hardware acceleration circuit is, for example, of ASIC type.

The hardware acceleration circuit, the programmable core and the memory communicate, for example, with one another using a communication bus.

BRIEF DESCRIPTION OF THE DRAWINGS

Other features and advantages of the invention will become apparent from the following description given as an illustration and in a nonlimiting manner, in light of the attached drawings in which.

DETAILED DESCRIPTION

Figure 1:
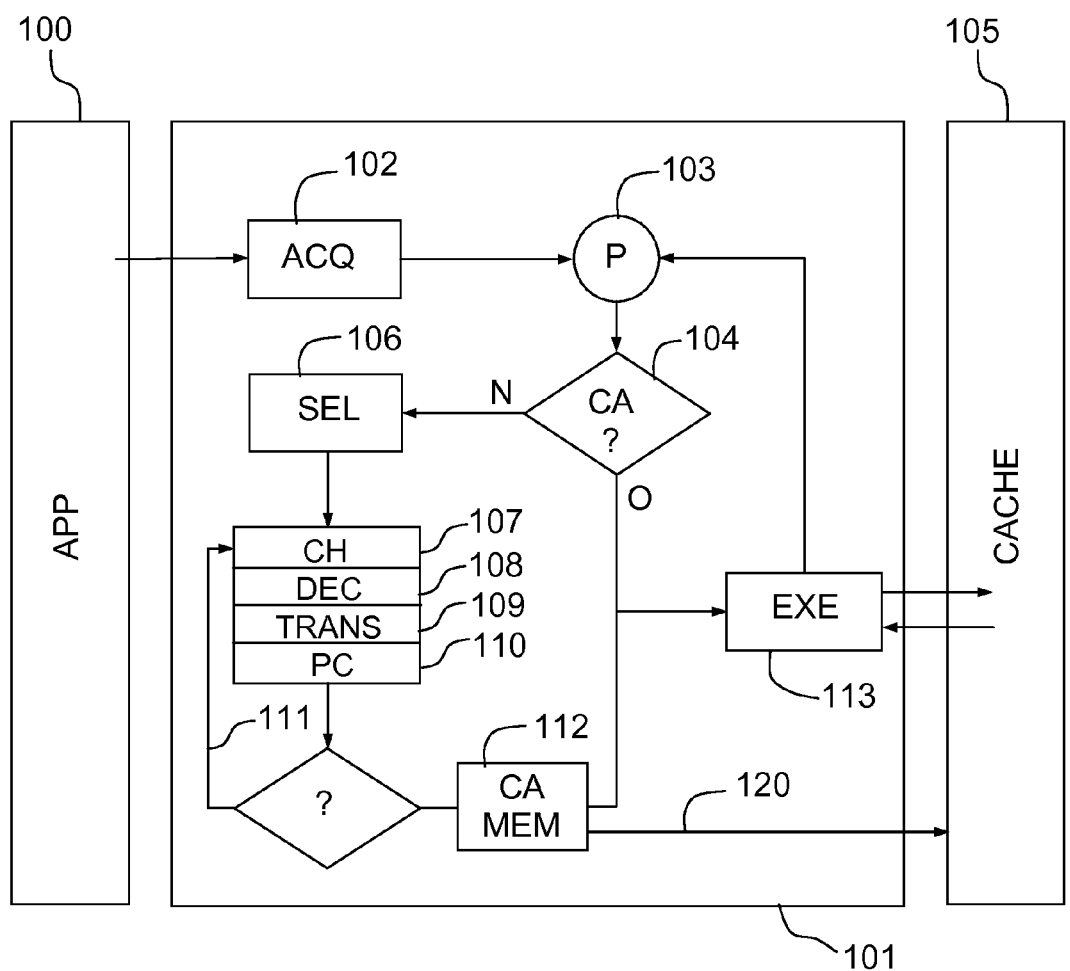
FIG. 1 gives an example of a system implementing the principle of a dynamic compilation.

FIG. 1 gives an example of a system implementing the principle of a dynamic compilation.

In this example, an instruction flow stored in a general memory 100 is used as input for a device 101 implementing the dynamic compilation of this flow. This instruction flow corresponds, for example, to an intermediate representation obtained from source code of a given application, to the source code itself or to machine code. The dynamic compilation device 101 comprises a context acquisition module 102 making it possible to locate all of the instructions of the flow of operations to be compiled in order for them to be executed. When a code portion corresponding to one or more instructions is identified to be compiled, the latter is loaded and a code execution pointer is updated 103. This pointer is, for example, directed to the address of the start of a code portion to be analyzed to possibly compile it or to recompile it. Hereinafter in the description, this code portion is called current code portion.

There is then a check 104 to see if the acquired code portion has already been translated into machine code. In this example, the machine code is stored in a cache memory 105 accessible to the device 101. The checking step 104 is therefore implemented by checking to see if the portion of machine code corresponding to the current code portion 102 is present in cache memory 105 can be implemented. It is in fact the usual practice to store the machine code obtained after translation in a cache memory 105.

If the current code portion has already been translated, the dynamic compilation environment points 113 to the corresponding machine code so as to execute it.

If the code portion has not yet been translated, then the current code portion is considered 106 as a code portion to be compiled. The processing applied is then made up of a succession of operations. Firstly, the current code portion is loaded 107 from the main memory 100 to a memory internal to the dynamic compilation system. Next, the current code portion is decoded, that is to say it is decomposed 108 into basic information. This decomposition corresponds, for example, to an identification of a set of simple operations making it possible to perform the function or functions implemented by the current code portion. These simple operations correspond, for example, to additions and subtractions. Another objective of the decoding is to identify the data to be used as input by these operations. Once decoded, the code is translated 109 into machine code that can be directly executed by the target.

There is then a check 110 to see if at least one second portion of intermediate code is linked to the current portion. A link is a branch to another portion of the intermediate code implemented, for example, by an address jump. If there is a linked portion of intermediate code, the steps 107, 108, 109, 110 are applied to it. If not, 112, the machine code resulting from the translation of one or more code portions is stored 120 in the cache memory 105 to be then executed by the target 113.

Once the machine code has been executed 113, the pointer to the input instruction flow is updated 103 and the processing of the next code portion is implemented.

The dynamic compilation system according to the invention comprises a hardware accelerator implementing a set of functions. This hardware accelerator operates in parallel with a programmable core. The aim of the combined use of these two processing elements is notably to improve the performance levels in terms of execution of applications using the dynamic compilation. The proposed system makes it possible to obtain performance levels comparable to those obtained on a processor of general-purpose type while satisfying the constraints of embedded technology in terms of consumption, execution performance and occupied surface area. Advantageously, the memory size required to store machine code can be reduced. This is because, in the system according to the invention, the machine code can be generated more rapidly. It is therefore possible to free up memory allocated to the code portions least used and to regenerate said portions as required.

The use of a hardware accelerator makes it possible to obtain a maximum saving in terms of execution times for the loading and decoding processing operations by allocating to them dedicated resources specifically developed for this purpose. The use of a programmable core for the transformation into machine code enables the system to be able to be adapted to different targets.

In a preferred embodiment, the set of functions implemented by the hardware accelerator comprises the loading 107 and decoding 108 functions. The hardware accelerator is a circuit specially dedicated to these functions. This accelerator is, for example, a circuit of ASIC (Application-Specific Integrated Circuit) type.

Figure 2:
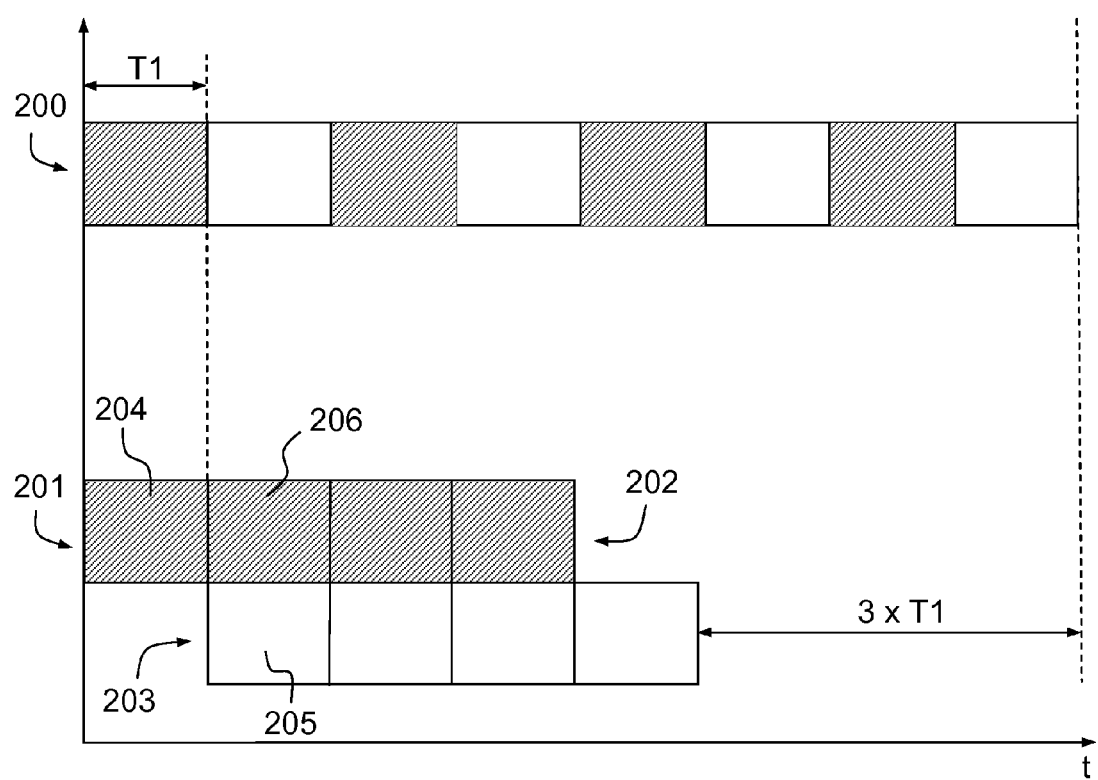
FIG. 2 is a timing diagram illustrating the improvements in terms of execution times obtained by the system according to the invention.

FIG. 2 is a timing diagram illustrating the improvements in terms of execution times obtained by the system according to the invention.

In this example, it is considered that four code portions are processed. These code portions are loaded and decoded then translated into machine code.

In a conventional system 200, for each of these code portions, the operations of loading and decoding on the one hand then of translation into machine code on the other hand are executed sequentially. These operations are usually implemented by a programmable processor.

In a simplified manner, and in order to best illustrate one of the advantages of the system according to the invention with regard to the execution time, it is considered that these two phases take an identical time T1 regardless of the code portion processed. Thus, to process four code portions, eight time bands of duration T1 are required.

In the case of a dynamic compilation system according to the invention 201, the use of a hardware accelerator to perform the loading and decoding operations 202 in parallel with the use of a programmable core to perform the operations of translation into machine code 203 makes it possible to paralyze these operations. Thus, once the loading and decoding operations 204 for the first code portion are performed, the translation operation 205 is carried out by the programmable core. Consequently, the hardware assistant is available during this time to perform the loading and decoding operations 206 for the second code portion to be processed. The joint use of the hardware assistant and of the programmable core thus makes it possible to process four code portions in a time equal to 5×T1. Thus, a time saving of 3×T1 is obtained in terms of execution time.

Figure 3:
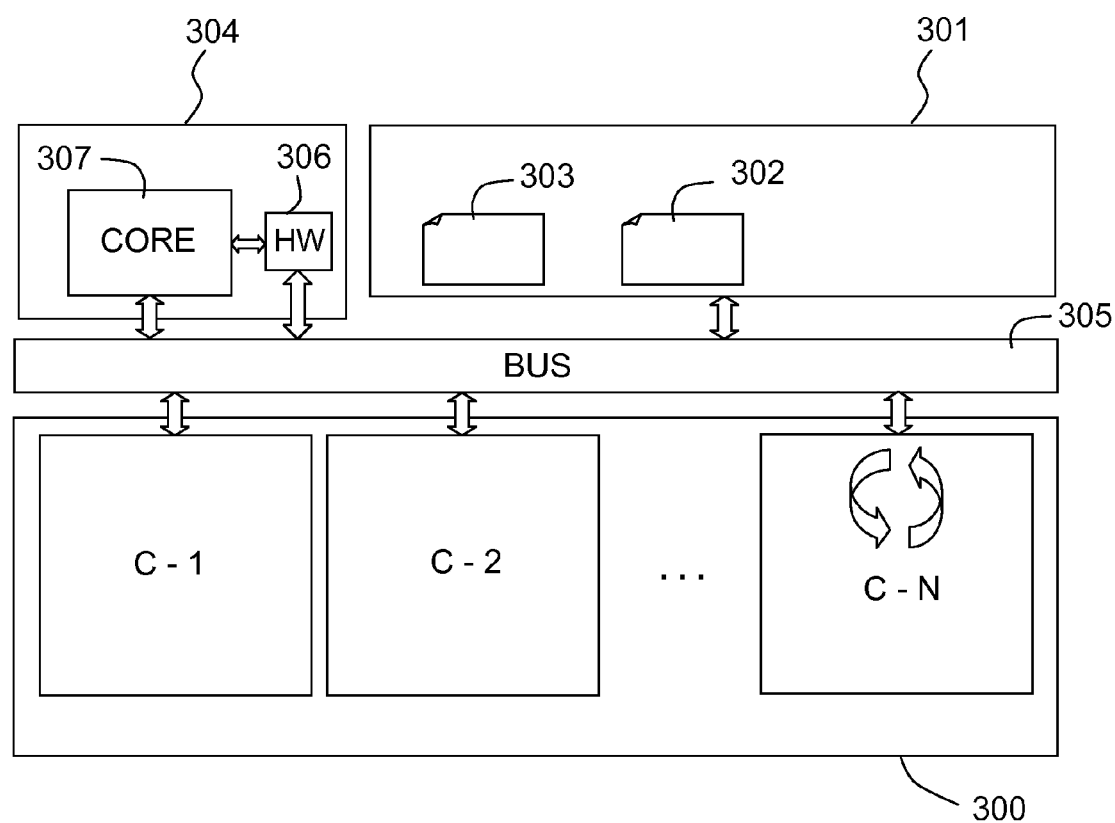
FIG. 3 gives an example of an embedded architecture in which a dynamic compilation system is used.

FIG. 3 gives an example of embedded architecture in which a dynamic compilation system is used.

This architecture comprises a multiple-core device 300 comprising N cores used for the execution of applications. In other words, the multiple-core device 300 corresponds to N execution targets. Said architecture also comprises a memory area making it possible to store machine code 302 and at least one flow of operations 303 corresponding to at least one program memory dedicated to the target. Alternatively, the machine code generated can be sent into a memory area.

A dynamic compilation system 304 is used to optimize the performance levels of the system. This system 304 is made up of a hardware accelerator 306 and of a programmable core 307. The programmable core corresponds, for example, to an RISC (Reduced Instruction Set Computer) processor and the hardware accelerator 306 to an ASIC circuit.

A memory 301 is used to store the instruction flow to be processed 303 and the machine code 302 that can be executed by the core. The instruction flow corresponds, for example, to the source code of the application, to an intermediate representation, or to machine code. The instruction flow is made up of one or more code portions.

The three components 300, 301, 304 can communicate with one another using a communication bus 305.

Figure 4:
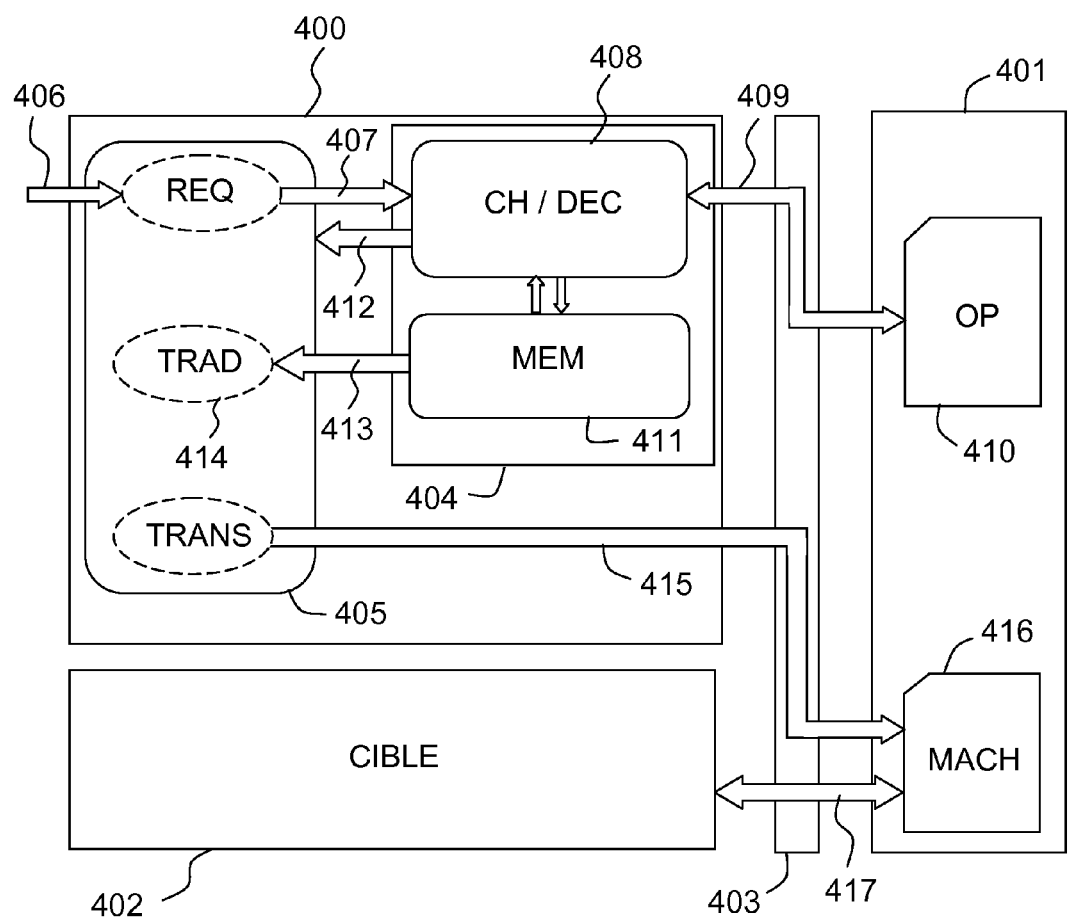
FIG. 4 presents an embodiment of the dynamic compilation system according to the invention.

FIG. 4 presents an embodiment of the dynamic compilation system.

The dynamic compilation system 400 can communicate with at least one memory 401 and a target 402 using a communication bus 403.

The dynamic compilation system 400 is made up of a hardware accelerator 404 and a programmable core 405.

In this exemplary implementation, the system operates as follows when the execution of a program associated with a given application is requested. A request 406 is transmitted to the programmable core 405 and corresponds to an order for compilation and/or recompilation of a code portion belonging to a given application. This request is, for example, generated by the target 402.

The programmable core 405 in turn sends a request 407 to the hardware accelerator 404. As described previously, the function of the hardware accelerator 404 is to load the flow of operations to be compiled and decoded. For this, the hardware assistant 404 comprises a module 408 making it possible to carry out these operations. This module browses the flow of operations to be processed implementing the application to be compiled. Said module 408 will therefore access 409 an area 410 of the memory 401 containing the code portion to be compiled, load it and decode it. It should be noted that a prior check can be carried out, said check aiming to determine if the code portion is not available in result memory. This makes it possible to avoid redoing the loading and decoding operations if they have already been performed.

The result obtained is, for example, stored in a memory 411 internal to the hardware accelerator 404. This internal memory 411 is called result memory.

When the work of the hardware assistant 404 is finished for the code portion currently being processed, an acknowledge request 412 is sent to the programmable core 405. This request 412 indicates to the programmable core 405 that the result of the loading and decoding operations is available. The programmable core accesses 413 this result and translates 414 the decoded flow of operations into machine code that can be used directly by the target 402. In parallel, the programmable core waits for a new request. Alternatively, it sends a request to the hardware assistant 404 to process the next code portion to be compiled and executed. The machine code is then transmitted 415 and stored 416 in memory 401. In this example, the memory area 416 is accessible to the different elements of the architecture. The target 417 can thus access the machine code to be executed.

Figure 5:
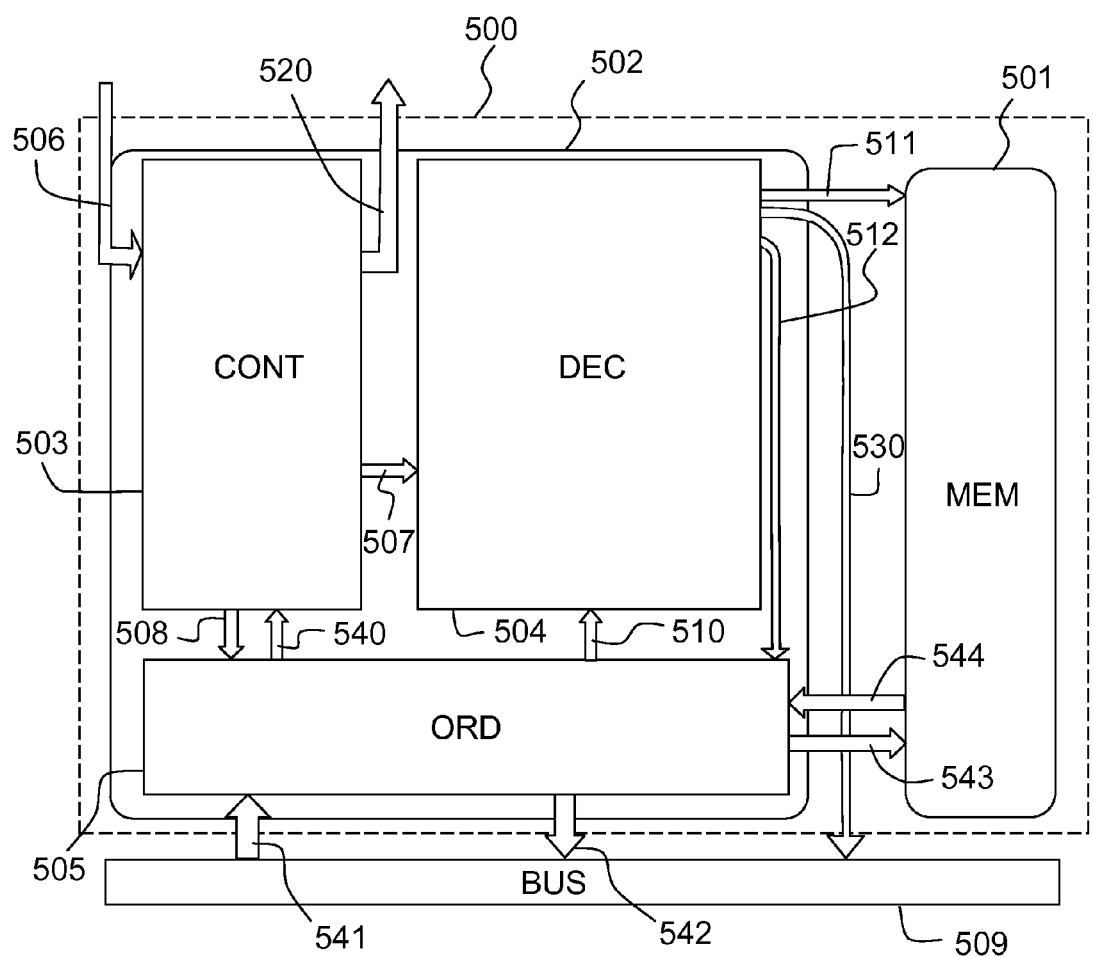
FIG. 5 gives an example of implementation of a hardware accelerator for a dynamic compilation system.

FIG. 5 gives an example of hardware accelerator implementation for the dynamic compilation system. This hardware assistant is made up of a result memory 501 and a loading and decoding module 502. The module 502 is made up of three blocks. A first block 503 acts as controller. A second block 504 acts as decoder. A third block 505 acts as instruction flow loading unit. The controller 503 is responsible for managing the requests from the programmable core. The controller receives the compilation requests 506 and transmits them 507 to the decoder and 508 to the loading unit 505. The function of the loading unit 505 is to load the code portion to be analyzed. For that, it browses the flow of operations that make up the program to be compiled so as to identify and load at least one code portion. Furthermore, it checks that the flow of operations has not already been loaded and decoded in result memory 501. If it has, it is then possible to directly use the code already decoded and trigger, via the controller 503, a request to the programmable core for the latter to proceed with the translation into machine code. A memory request 543 to go and check if the code portion has not already been loaded and decoded can be used. Thus, the processing time is reduced because there is no longer a need to redecode all of the instruction flow implementing the application.

A memory request 542 is used to recover the code portion for example by using a communication bus 509. The result of this request 541 can also be acquired via the communication bus 509.

The loading unit 505 transmits the instructions one by one 510 to the decoding block 504.

When an instruction has been decoded, the result is sent 511 and stored in the result memory 501. The decoded instruction can also be sent 512 to the loading unit 505 in order to assist it in its browsing of the instruction flow. This information can also be used when all of the instructions of the code portion have been decoded to inform the controller 503 that the analysis is finished and that a return request 520 can be sent to the programmable core via the controller 505 and an acknowledgement request 540.

In another embodiment, it is also possible to transmit 530 the output of the decoder 504 to the target for an execution on the fly. This is possible provided that the decoder is chosen such that it can directly supply machine code instructions to the target and therefore that the use of a programmable core for the translation is not required.

The invention claimed is:

1. A compilation system for an instruction flow to be executed on a target circuit comprising:
   a hardware acceleration circuit performing functions of loading and decoding a portion of the instruction flow to a result memory internal to the hardware acceleration circuit, wherein decoding of the portion of the instruction flow corresponds to decompose the portion of the instruction flow into a set of simple operations;
   a programmable core, for instructions, resulted from the loading and the decoding of the portion of the instruction flow, being transmitted to the programmable core operating in parallel to the hardware acceleration circuit, the programmable core producing a transcription of the decoded portion of the instructions flow into machine code suitable for execution on the target circuit;
   wherein the hardware acceleration circuit selecting a portion of the instruction flow, and checking if the selected portion of the instruction flow already has been translated into machine code, if so the selected portion of the instruction flow is not loaded by the hardware acceleration circuit, and another portion is selected; and
   a mechanism determining a time during which a machine code corresponding to a code portion dynamic compiled previously by the compilation system has not been executed, the memory used to store the machine code corresponding to the code portion being freed up if the time exceeds a predefined value.

2. The compilation system as claimed in claim 1, in which wherein the instruction flow is an intermediate representation previously obtained from source code of an application to be executed.

3. The compilation system as claimed in claim 1, wherein the instruction flow is source code of an application to be executed.

4. The compilation system as claimed in claim 1, wherein the instruction flow is the machine code of an application to be adapted or optimized for the target circuit.

5. The compilation system as claimed in claim 1, wherein the checking for the existence of an earlier translated machine code of the selected portion is being performed by a comparison of an address of the selected portion of the instruction flow to be loaded against an addresses of the translated machine code of the selected portion of the instruction flow contained in the result memory internal to the hardware acceleration circuit.

6. The compilation system as claimed in claim 1, wherein the machine code generated is transmitted to a memory external to the compilation system to be stored.

7. The compilation system as claimed in claim 1, wherein the result memory of the loaded and decoded code is internal to the compilation system.

8. The compilation system as claimed in claim 1, wherein the hardware acceleration circuit is Application-Specific-Integrated (ASIC) type.

9. The compilation system as claimed in claim 1, wherein the hardware acceleration circuit, the programmable core and the result memory communicate with one another using a communication bus.

* * * * *